(12) United States Patent
Boeckh et al.

(10) Patent No.: US 8,669,221 B2
(45) Date of Patent: *Mar. 11, 2014

(54) CLEANING COMPOSITIONS WITH ALKOXYLATED POLYALKYLENIMINES

(75) Inventors: Dieter Boeckh, Limburgerhof (DE);
Christian Bittner, Bensheim (DE);
Andrea Margret Misske, Speyer (DE);
Arturo Luis Casado Dominguez, Brussels (BE)

(73) Assignee: The Procter & Gamble Company, Cincinnati, OH (US)

( * ) Notice: Subject to any disclaimer, the term of this patent is extended or adjusted under 35 U.S.C. 154(b) by 29 days.

This patent is subject to a terminal disclaimer.

(21) Appl. No.: 11/918,752

(22) PCT Filed: Apr. 12, 2006

(86) PCT No.: PCT/EP2006/061553
§ 371 (c)(1),
(2), (4) Date: Feb. 25, 2009

(87) PCT Pub. No.: WO2006/108857
PCT Pub. Date: Oct. 19, 2006

(65) Prior Publication Data
US 2009/0215662 A1    Aug. 27, 2009

Related U.S. Application Data

(60) Provisional application No. 60/671,493, filed on Apr. 15, 2005.

(51) Int. Cl.
*C11D 3/30* (2006.01)
*B08B 3/04* (2006.01)

(52) U.S. Cl.
USPC .......... 510/360; 510/421; 510/475; 510/499; 8/137

(58) Field of Classification Search
USPC ............... 510/360, 421, 475, 499; 8/137
See application file for complete search history.

(56) References Cited

U.S. PATENT DOCUMENTS

| | | | | |
|---|---|---|---|---|
| 6,075,000 | A | * | 6/2000 | Rohrbaugh et al. .......... 510/299 |
| 6,127,331 | A | * | 10/2000 | Cleary et al. ................. 510/528 |
| 6,156,720 | A | * | 12/2000 | Boeckh et al. ................ 510/475 |
| 6,300,304 | B1 | * | 10/2001 | Boeckh et al. ................ 510/475 |

FOREIGN PATENT DOCUMENTS

WO    WO 99/01530    *    1/1999    ............... C11D 3/37

* cited by examiner

*Primary Examiner* — Brian P Mruk
(74) *Attorney, Agent, or Firm* — Melissa G Krasovec

(57) ABSTRACT

Cleaning compositions comprising amphiphilic water-soluble alkoxylated polyalkylenimines having an inner polyethylene oxide block and an outer polypropylene oxide block.

11 Claims, No Drawings

CLEANING COMPOSITIONS WITH ALKOXYLATED POLYALKYLENIMINES

REFERENCE TO RELATED APPLICATION

This application claims the benefit of U.S. provisional application No. 60/671,493, filed Apr. 15, 2005.

FIELD OF THE INVENTION

The present invention is directed to laundry compositions and cleaning compositions containing amphiphilic water-soluble alkoxylated polyalkylenimines having an inner polyethylene oxide block and an outer polypropylene oxide block.

SUMMARY OF THE INVENTION

A laundry detergent or cleaning composition which comprises an amphiphilic water-soluble alkoxylated polyalkylenimine of the general formula I

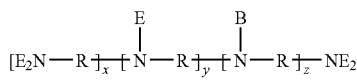

in which the variables are each defined as follows:
R are identical or different, linear or branched $C_2$-$C_6$-alkylene radicals; B is a branch;
E is an alkylenoxy unit of the formula

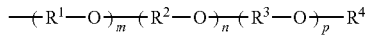

$R^1$ is 1,2-propylene, 1,2-butylene and/or 1,2-isobutylene; $R^2$ is ethylene; $R^3$ is 1,2-propylene; $R^4$ are identical or different radicals: hydrogen; $C_1$-$C_4$-alkyl; x, y, z are each from 2 to 150, where the sum of x+y+z means a number of alkylenimine units which corresponds to an average molecular weight $M_W$ of the polyalkylenimine before the alkoxylation of from 300 to 10 000; m is a rational number from 0 to 2; n is a rational number from 6 to 18; p is a rational number from 3 to 12, where $0.8 \leq n/p \leq 1.0(x+y+z)^{1/2}$; and quaternization products thereof.

DETAILED DESCRIPTION OF THE INVENTION

The present invention relates to novel amphiphilic water-soluble alkoxylated polyalkylenimines of the general formula I:

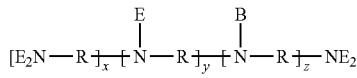

in which the variables are each defined as follows:
R are identical or different, linear or branched $C_2$-$C_6$-alkylene radicals;
B is a branch;
E is an alkylenoxy unit of the formula

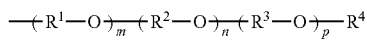

$R^1$ is 1,2-propylene, 1,2-butylene and/or 1,2-isobutylene;
$R^2$ is ethylene;
$R^3$ is 1,2-propylene;
$R^4$ are identical or different radicals: hydrogen; $C_1$-$C_4$-alkyl; x, y, z are each from 2 to 150, where the sum of x+y+z means a number of alkylenimine units which corresponds to an average molecular weight $M_W$ of the polyalkylenimine before the alkoxylation of from 300 to 10 000;
m is a rational number from 0 to 2;
n is a rational number from 6 to 18;
p is a rational number from 3 to 12, where $0.8 \leq n/p \leq 1.0(x+y+z)^{1/2}$;
and quaternization products thereof.

The invention further relates to the use of these alkoxylated polyalkylenimines as a soil detachment-promoting additive to laundry detergents and cleaning compositions, and to laundry detergents and cleaning compositions which comprise the alkoxylated polyalkylenimines.

In addition to surfactants, polymers are also used as soil detachment-promoting additives for laundry detergents and cleaning compositions. The known polymers are very suitable, for example, as dispersants of soil pigments such as clay minerals or soot, and as additives which prevent the reattachment of already detached soil. Such dispersants are, though, especially at low temperatures, substantially ineffective in the removal of greasy soil from the surfaces.

WO-A-99/67352 describes dispersants for hydrophobic soil which are compatible with peroxidic bleaches, are said to prevent the resettling of the greasy soil detached in the course of washing onto the cleaned textile and are based on alkoxylated polyethylenimines which have an inner polypropylene oxide block and an outer, distinctly larger polyethylene oxide block.

U.S. Pat. No. 5,565,145 recommends, as dispersants for nonpolar particulate soil, uncharged alkoxylated polyethylenimines which may contain up to 4 propylene oxide units per active NH group bonded directly to the nitrogen atom. However, preferred and demonstrated by way of example are polyethylenimines which are exclusively ethoxylated or at most incipiently propoxylated, i.e. not more than 1 mol of propylene oxide per NH group.

These alkoxylated polyethylenimines too are good dispersants for hydrophilic soil pigments, but do not show a satisfactory wash result in the case of greasy stains.

Polyethylenimines which have an inner polyethylene oxide block and an outer polypropylene oxide block are yet to be used in laundry detergents or cleaning compositions.

U.S. Pat. No. 4,076,497 discloses the use of initially ethoxylated and then propoxylated polyethylenimines which have been reacted in total with 30 mol of alkylene oxide, including at least 15 mol of propylene oxide, per mole of active NH group as assistants for the dyeing of polyester and cellulose fibers with dispersion dyes. However, the alkylenoxy chains of the inventive polyalkylenimines contain at most 12 propylenoxy units.

DE-A-22 27 546 describes, as well as polyethylenimines which have the reverse alkylene oxide sequence, also polyethylenimines which have initially been ethoxylated and then propoxylated as breakers for crude oil emulsions. However, in comparison to the inventive polyalkylenimines, these polyethylenimines have too high a total degree of alkoxylation of at least 105 mol of alkylene oxide per mole of alkoxylatable NH group and too high a molar ratio of propylene oxide to ethylene oxide of from 1.9 to 4:1 (or conversely too small a molar ratio of ethylene oxide to propylene oxide of from 0.53 to 0.25).

JP-A-2003-020585 describes the use of alkoxylated polyethylenimines in deinking processes. As well as polyethylenimines which are preferably exclusively ethoxylated or else initially ethoxylated and then alkoxylated randomly with an ethylene oxide/propylene oxide mixture, a product is also disclosed which is based on a polyethylenimine of average molecular weight $M_W$ 600 and has been reacted initially with 100 mol of ethylene oxide and then with 100 mol of propylene oxide per mole of alkoxylatable NH group and thus likewise with a very much larger amount of alkylene oxide than in the case of the inventive polyethylenimines.

Finally, EP-A-359 034 discloses assistants for the preparation and stabilization of nonaqueous pigment dispersions which are based on at least two polyethylenimines comprising polyalkylene oxide blocks. When polyethylenimines which have an outer block of a higher alkylene oxide are used, they are always initially ethoxylated and then butoxylated compounds, some of which contain a small intermediate polypropylene oxide block. Polyethylenimines which have an inner polyethylene oxide block and an outer polypropylene oxide block are always additionally reacted with at least one mol per mole of active NH group of an α-olefin oxide (α-$C_{12}$/$C_{14}$—, $C_{16}$/$C_{18}$— or $C_{20}$-$C_{28}$-olefin oxide).

It is an object of the invention to provide polymers which are suitable as an additive to laundry detergents and cleaning compositions for removing greasy soil from textile and hard surfaces. In particular, the polymers should also exhibit good greasy soil-detaching action even at low washing temperatures.

Accordingly, amphiphilic water-soluble alkoxylated polyalkylenimines of the general formula I:

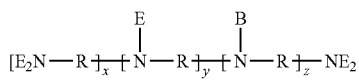

in which the variables are each defined as follows:

R are identical or different, linear or branched $C_2$-$C_6$-alkylene radicals;

B is a branch;

E is an alkylenoxy unit of the formula

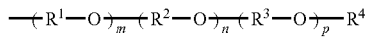

$R^1$ is 1,2-propylene, 1,2-butylene and/or 1,2-isobutylene;

$R^2$ is ethylene;

$R^3$ is 1,2-propylene;

$R^4$ are identical or different radicals: hydrogen; $C_1$-$C_4$-alkyl;

x, y, z are each from 2 to 150, where the sum of x+y+z means a number of alkylenimine units which corresponds to an average molecular weight $M_w$ of the polyalkylenimine before the alkoxylation of from 300 to 10 000;

m is a rational number from 0 to 2;

n is a rational number from 6 to 18;

p is a rational number from 3 to 12, where $0.8 \leq n/p \leq 1.0 (x+y+z)^{1/2}$;

and quaternization products thereof have been found.

An essential property of the inventive alkoxylated polyalkylenimines is their amphiphilicity, i.e. they have a balanced ratio of hydrophobic and hydrophilic structural elements and are thus firstly hydrophobic enough to absorb on greasy soil and to remove them together with the surfactants and the remaining washing components of the laundry detergents and cleaning compositions, but secondly also hydrophilic enough to keep the detached greasy soil in the washing and cleaning liquor and prevent it from resettling on the surface.

This effect is achieved by the alkoxylated polyalkylenimines having an inner polyethylene oxide block and an outer polypropylene oxide block, the degree of ethoxylation and the degree of propoxylation not going above or below specific limiting values, and their ratio being at least 0.8 and within a range whose upper limit according to the empirically found relationship $n/p \leq 1.0(x+y+z)^{1/2}$ is determined by the molecular weight of the polyalkylenimine used.

The inventive alkoxylated polyalkylenimines have a basic skeleton which comprises primary, secondary and tertiary amine nitrogen atoms which are joined by alkylene radicals R and are in the form of the following moieties in random arrangement:

primary amino moieties which terminate the main chain and the side chains of the basic skeleton and whose hydrogen atoms are subsequently replaced by alkylenoxy units:

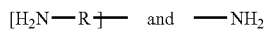

secondary amino moieties whose hydrogen atom is subsequently replaced by alkylenoxy units:

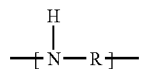

tertiary amino moieties which branch the main chain and the side chains:

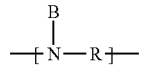

Before the alkylation, the polyalkylenimine has an average molecular weight $M_W$ of from 300 to 10 000. The sum x+y+z of the repeating units of the primary, secondary and tertiary amino moieties means a total number of alkylenimine units which corresponds to these molecular weights.

The molecular weight $M_W$ of the polyalkylenimine is preferably from 500 to 7500 and more preferably from 1000 to 6000.

The R radicals connecting the amine nitrogen atoms may be identical or different, linear or branched $C_2$-$C_6$-alkylene radicals. A preferred branched alkylene is 1,2-propylene. A particularly preferred alkylene radical R is ethylene.

Since cyclizations are possible in the formation of the basic polyalkylenimine skeleton, it is also possible for cyclic amino moieties to be present to a small extent in the basic skeleton and they are of course alkoxylated in the same way as the noncyclic primary and secondary amino moieties.

The hydrogen atoms of the primary and secondary amino groups of the basic polyalkylenimine skeleton are replaced by alkylenoxy units of the formula

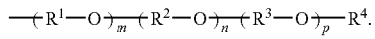

In this formula, the variables are each defined as follows:

$R^1$ is 1,2-propylene, 1,2-butylene or 1,2-isobutylene, preferably 1,2-propylene;

$R^2$ is ethylene;

$R^3$ is 1,2-propylene;

$R^4$ is hydrogen or $C_1$-$C_4$-alkyl, preferably hydrogen;

m is a rational number of 0 to 2; when m ≠ 0, preferably about 1;

n is a rational number from 6 to 18;

p is a rational number from 3 to 12, where $0.8 \leq n/p \leq 1.0(x+y+z)^{1/2}$.

n and p are preferably defined as follows:

n is a rational number from 7 to 15;

p is a rational number from 4 to 10, where $0.9 \leq n/p \leq 0.8(x+y+z)^{1/2}$.

n and p are more preferably each defined as follows:

n is a rational number from 8 to 12;

p is a rational number from 5 to 8, where $1.0 \leq n/p \leq 0.6(x+y+z)^{1/2}$.

The substantial part of these alkylenoxy units is formed by the ethylenoxy units $—(R^2—O)_n—$ and the propylenoxy units $—(R^3—O)_p—$.

The alkylenoxy units may additionally also have a small proportion of propylenoxy or butylenoxy units $—(R^1—O)_m—$, i.e. the polyalkylenimine may be reacted initially with small amounts of up to 2 mol, especially from 0.5 to 1.5 mol, in particular from 0.8 to 1.2 mol, of propylene oxide or butylene oxide per mole of NH moiety present, i.e. incipiently alkoxylated.

This modification of the polyalkylenimine allows, if necessary, the viscosity of the reaction mixture in the alkoxylation to be lowered. However, the modification generally does not influence the performance properties of the alkoxylated polyalkylenimine and therefore does not constitute a preferred measure.

The inventive alkoxylated polyalkylenimines may also be quaternized. A suitable degree of quaternization is up to 50%, in particular from 5 to 40%. The quaternization is effected preferably by introducing $C_1$-$C_4$-alkyl groups and may be undertaken in a customary manner by reaction with corresponding alkyl halides and dialkyl sulfates.

The quaternization may be advantageous in order to adjust the alkoxylated polyalkylenimines to the particular composition of the laundry detergent and cleaning composition in which they are to be used, and to achieve better compatibility and/or phase stability of the formulation. The alkoxylated polyalkylenimines are preferably not quaternized.

The inventive alkoxylated polyalkylenimines may be prepared in a known manner.

One preferred procedure consists in initially undertaking only an incipient alkoxylation of the polyalkylenimine in a first step.

In this step, the polyalkylenimine is reacted only with a portion of the total amount of ethylene oxide used, which corresponds to about 1 mol of ethylene oxide per mole of NH moiety or, when the polyalkylenimine is to be modified initially with up to 2 mol of propylene oxide or butylene oxide per mole of NH moiety, here too initially only with up to 1 mol of this alkylene oxide.

This reaction is undertaken generally in the absence of a catalyst in aqueous solution at from 70 to 200° C., preferably from 80 to 160° C., under a pressure of up to 10 bar, in particular up to 8 bar.

In a second step, the further alkoxylation is then effected by subsequent reaction i) with the remaining amount of ethylene oxide or, in the case of a modification by higher alkylene oxide in the first step, with the entirety of ethylene oxide and ii) with propylene oxide.

The further alkoxylation is undertaken typically in the presence of a basic catalyst. Examples of suitable catalysts are alkali metal and alkaline earth metal hydroxides such as sodium hydroxide, potassium hydroxide and calcium hydroxide, alkali metal alkoxides, in particular sodium and potassium $C_1$-$C_4$-alkoxides, such as sodium methoxide, sodium ethoxide and potassium tert-butoxide, alkali metal and alkaline earth metal hydrides such as sodium hydride and calcium hydride, and alkali metal carbonates such as sodium carbonate and potassium carbonate. Preference is given to the alkali metal hydroxides and the alkali metal alkoxides, particular preference being given to potassium hydroxide and sodium hydroxide. Typical use amounts for the base are from 0.05 to 10% by weight, in particular from 0.5 to 2% by weight, based on the total amount of polyalkylenimine and alkylene oxide.

The further alkoxylation may be undertaken in substance (variant a)) or in an organic solvent (variant b)). The process conditions specified below may be used both for the ethoxylation and for the subsequent propoxylation.

In variant a), the aqueous solution of the incipiently alkoxylated polyalkylenimine obtained in the first step, after addition of the catalyst, is initially dewatered. This can be done in a simple manner by heating to from 80 to 150° C. and distilling off the water under a reduced pressure of from 0.01 to 0.5 bar. The subsequent reaction with the alkylene oxide is effected typically at from 70 to 200° C., preferably from 100 to 180° C., and at a pressure of up to 10 bar, in particular up to 8 bar, and a continued stirring time of from about 0.5 to 4 h at from about 100 to 160° C. and constant pressure follows in each case.

Suitable reaction media for variant b) are in particular nonpolar and polar aprotic organic solvents. Examples of particularly suitable nonpolar aprotic solvents include aliphatic and aromatic hydrocarbons such as hexane, cyclohexane, toluene and xylene. Examples of particularly suitable polar aprotic solvents are ethers, in particular cyclic ethers such as tetrahydrofuran and dioxane, N,N-dialkylamides such as dimethylformamide and dimethylacetamide, and N-alkyllactams such as N-methylpyrrolidone. It is of course also possible to use mixtures of these aprotic solvents. Preferred solvents are xylene and toluene.

In variant b) too, the solution obtained in the first step, after addition of catalyst and solvent, is initially dewatered, which is advantageously done by separating out the water at a temperature of from 120 to 180° C., preferably supported by a gentle nitrogen stream. The subsequent reaction with the alkylene oxide may be effected as in variant a).

In variant a), the alkoxylated polyalkylenimine is obtained directly in substance and may be converted if desired to an aqueous solution. In variant b), the organic solvent is typically removed and replaced by water. The products may of course also be isolated in substance.

The inventive alkoxylated polyalkylenimines, as a 1% by weight solution in distilled water, have a cloud point of generally ≤70° C., preferably ≤65° C. The cloud point is more preferably in the range from 25 to 55° C.

The inventive alkoxylated polyalkylenimines are outstandingly suitable as a soil detachment-promoting additive for laundry detergents and cleaning compositions. They exhibit high dissolving power especially in the case of greasy soil. It is of particular advantage that they display the soil-detaching power even at low washing temperatures.

The likewise inventive laundry detergents and cleaning compositions comprise generally from 0.05 to 10% by weight, preferably from 0.1 to 5% by weight and more preferably from 0.25 to 2.5% by weight, based on the particular overall composition, of the inventive alkoxylated polyalkylenimines.

In addition, the laundry detergents and cleaning compositions generally comprise surfactants and, if appropriate, further polymers as washing substances, builders and further customary ingredients, for example cobuilders, complexing agents, bleaches, standardizers, graying inhibitors, dye transfer inhibitors, enzymes and perfumes.

The alkoxylated polyalkylenimines of the present invention may be utilized in laundry detergents or cleaning compositions comprising a surfactant system comprising $C_{10}$-$C_{15}$ alkyl benzene sulfonates (LAS) and one or more co-surfactants selected from nonionic, cationic, anionic or mixtures thereof. The selection of co-surfactant may be dependent upon the desired benefit. In one embodiment, the co-surfactant is selected as a nonionic surfactant, preferably $C_{12}$-$C_{18}$ alkyl ethoxylates. In another embodiment, the co-surfactant is selected as an anionic surfactant, preferably $C_{10}$-$C_{18}$ alkyl alkoxy sulfates ($AE_xS$) wherein x is from 1-30. In another embodiment the co-surfactant is selected as a cationic surfactant, preferably dimethyl hydroxyethyl lauryl ammonium chloride. If the surfactant system comprises $C_{10}$-$C_{15}$ alkyl benzene sulfonates (LAS), the LAS is used at levels ranging from about 9% to about 25%, or from about 13% to about 25%, or from about 15% to about 23% by weight of the composition.

The surfactant system may comprise from 0% to about 7%, or from about 0.1% to about 5%, or from about 1% to about 4% by weight of the composition of a co-surfactant selected from a nonionic co-surfactant, cationic co-surfactant, anionic co-surfactant and any mixture thereof.

Non-limiting examples of nonionic co-surfactants include: $C_{12}$-$C_{18}$ alkyl ethoxylates, such as, NEODOL® nonionic surfactants from Shell; $C_6$-$C_{12}$ alkyl phenol alkoxylates wherein the alkoxylate units are a mixture of ethyleneoxy and propyleneoxy units; $C_{12}$-$C_{18}$ alcohol and $C_6$-$C_{12}$ alkyl phenol condensates with ethylene oxide/propylene oxide block alkyl polyamine ethoxylates such as PLURONIC® from BASF; $C_{14}$-$C_{22}$ mid-chain branched alcohols, BA, as discussed in U.S. Pat. No. 6,150,322; $C_{14}$-$C_{22}$ mid-chain branched alkyl alkoxylates, $BAE_x$, wherein x is from 1-30, as discussed in U.S. Pat. Nos. 6,153,577, 6,020,303 and 6,093,856; Alkylpolysaccharides as discussed in U.S. Pat. No. 4,565,647 Llenado, issued Jan. 26, 1986; specifically alkylpolyglycosides as discussed in U.S. Pat. Nos. 4,483,780 and 4,483,779; Polyhydroxy fatty acid amides as discussed in U.S. Pat. No. 5,332,528; and ether capped poly(oxyalkylated) alcohol surfactants as discussed in U.S. Pat. No. 6,482,994 and WO 01/42408.

Non-limiting examples of semi-polar nonionic co-surfactants include: water-soluble amine oxides containing one alkyl moiety of from about 10 to about 18 carbon atoms and 2 moieties selected from the group consisting of alkyl moieties and hydroxyalkyl moieties containing from about 1 to about 3 carbon atoms; water-soluble phosphine oxides containing one alkyl moiety of from about 10 to about 18 carbon atoms and 2 moieties selected from the group consisting of alkyl moieties and hydroxyalkyl moieties containing from about 1 to about 3 carbon atoms; and water-soluble sulfoxides containing one alkyl moiety of from about 10 to about 18 carbon atoms and a moiety selected from the group consisting of alkyl moieties and hydroxyalkyl moieties of from about 1 to about 3 carbon atoms. See WO 01/32816, U.S. Pat. Nos. 4,681,704, and 4,133,779.

Non-limiting examples of cationic co-surfactants include: the quaternary ammonium surfactants, which can have up to 26 carbon atoms include: alkoxylate quaternary ammonium (AQA) surfactants as discussed in U.S. Pat. No. 6,136,769; dimethyl hydroxyethyl quaternary ammonium as discussed in U.S. Pat. No. 6,004,922; dimethyl hydroxyethyl lauryl ammonium chloride; polyamine cationic surfactants as discussed in WO 98/35002, WO 98/35003, WO 98/35004, WO 98/35005, and WO 98/35006; cationic ester surfactants as discussed in U.S. Pat. Nos. 4,228,042, 4,239,660 4,260,529 and 6,022,844; and amino surfactants as discussed in U.S. Pat. No. 6,221,825 and WO 00/47708, specifically amido propyldimethyl amine (APA).

Nonlimiting examples of anionic co-surfactants useful herein include: $C_{10}$-$C_{20}$ primary, branched chain and random alkyl sulfates (AS); $C_{10}$-$C_{18}$ secondary (2,3) alkyl sulfates; $C_{10}$-$C_{18}$ alkyl alkoxy sulfates ($AE_xS$) wherein x is from 1-30; $C_{10}$-$C_{18}$ alkyl alkoxy carboxylates comprising 1-5 ethoxy units; mid-chain branched alkyl sulfates as discussed in U.S. Pat. Nos. 6,020,303 and 6,060,443; mid-chain branched alkyl alkoxy sulfates as discussed in U.S. Pat. Nos. 6,008,181 and 6,020,303; modified alkylbenzene sulfonate (MLAS) as discussed in WO 99/05243, WO 99/05242 and WO 99/05244; methyl ester sulfonate (MES); and alpha-olefin sulfonate (AOS).

The present invention relates to compositions comprising the inventive alkoxylated polyalkylenimines and a surfactant system comprising $C_8$-$C_{18}$ linear alkyl sulphonate surfactant and a co-surfactant. The compositions can be in any form, namely, in the form of a liquid; a solid such as a powder, granules, agglomerate, paste, tablet, pouches, bar, gel; an emulsion; types delivered in dual-compartment containers; a spray or foam detergent; premoistened wipes (i.e., the cleaning composition in combination with a nonwoven material such as that discussed in U.S. Pat. No. 6,121,165, Mackey, et al.); dry wipes (i.e., the cleaning composition in combination with a nonwoven materials, such as that discussed in U.S. Pat. No. 5,980,931, Fowler, et al.) activated with water by a consumer; and other homogeneous or multiphase consumer cleaning product forms.

In one embodiment, the cleaning composition of the present invention is a liquid or solid laundry detergent composition. In another embodiment, the cleaning composition of the present invention is a hard surface cleaning composition, preferably wherein the hard surface cleaning composition impregnates a nonwoven substrate. As used herein "impregnate" means that the hard surface cleaning composition is placed in contact with a nonwoven substrate such that at least a portion of the nonwoven substrate is penetrated by the hard surface cleaning composition, preferably the hard surface cleaning composition saturates the nonwoven substrate. The cleaning composition may also be utilized in car care compositions, for cleaning various surfaces such as hard wood, tile, ceramic, plastic, leather, metal, glass. This cleaning composition could be also designed to be used in a personal care and pet care compositions such as shampoo composition, body wash, liquid or solid soap and other cleaning composition in which surfactant comes into contact with free hardness and in all compositions that require hardness tolerant surfactant system, such as oil drilling compositions.

In another embodiment the cleaning composition is a dish cleaning composition, such as liquid hand dishwashing compositions, solid automatic dishwashing compositions, liquid automatic dishwashing compositions, and tab/unit does forms of automatic dishwashing compositions.

Quite typically, cleaning compositions herein such as laundry detergents, laundry detergent additives, hard surface cleaners, synthetic and soap-based laundry bars, fabric softeners and fabric treatment liquids, solids and treatment articles of all kinds will require several adjuncts, though certain simply formulated products, such as bleach additives, may require only, for example, an oxygen bleaching agent and a surfactant as described herein. A comprehensive list of suitable laundry or cleaning adjunct materials can be found in WO 99/05242.

Common cleaning adjuncts include builders, enzymes, polymers not discussed above, bleaches, bleach activators, catalytic materials and the like excluding any materials already defined hereinabove. Other cleaning adjuncts herein can include suds boosters, suds suppressors (antifoams) and the like, diverse active ingredients or specialized materials such as dispersant polymers (e.g., from BASF Corp. or Rohm & Haas) other than those described above, color speckles, silvercare, anti-tarnish and/or anti-corrosion agents, dyes, fillers, germicides, alkalinity sources, hydrotropes, anti-oxidants, enzyme stabilizing agents, pro-perfumes, perfumes, solubilizing agents, carriers, processing aids, pigments, and, for liquid formulations, solvents, chelating agents, dye transfer inhibiting agents, dispersants, brighteners, suds suppressors, dyes, structure elasticizing agents, fabric softeners, anti-abrasion agents, hydrotropes, processing aids, and other fabric care agents, surface and skin care agents. Suitable examples of such other cleaning adjuncts and levels of use are found in U.S. Pat. Nos. 5,576,282, 6,306,812 B1 and 6,326,348 B1.

Method of Use

The present invention includes a method for cleaning a targeted surface. As used herein "targeted surface" may include such surfaces such as fabric, dishes, glasses, and other cooking surfaces, hard surfaces, hair or skin. As used herein "hard surface" includes hard surfaces being found in a typical home such as hard wood, tile, ceramic, plastic, leather, metal, glass. Such method includes the steps of contacting the composition comprising the modified polyol compound, in neat form or diluted in wash liquor, with at least a portion of a targeted surface then optionally rinsing the targeted surface. Preferably the targeted surface is subjected to a washing step prior to the aforementioned optional rinsing step. For purposes of the present invention, washing includes, but is not limited to, scrubbing, wiping and mechanical agitation.

As will be appreciated by one skilled in the art, the cleaning compositions of the present invention are ideally suited for use in home care (hard surface cleaning compositions), personal care and/or laundry applications.

The composition solution pH is chosen to be the most complimentary to a target surface to be cleaned spanning broad range of pH, from about 5 to about 11. For personal care such as skin and hair cleaning pH of such composition preferably has a pH from about 5 to about 8 for laundry cleaning compositions pH of from about 8 to about 10. The compositions are preferably employed at concentrations of from about 200 ppm to about 10,000 ppm in solution. The water temperatures preferably range from about 5° C. to about 100° C.

For use in laundry cleaning compositions, the compositions are preferably employed at concentrations from about 200 ppm to about 10000 ppm in solution (or wash liquor). The water temperatures preferably range from about 5° C. to about 60° C. The water to fabric ratio is preferably from about 1:1 to about 20:1.

The method may include the step of contacting a nonwoven substrate impregnated with an embodiment of the composition of the present invention As used herein "nonwoven substrate" can comprise any conventionally fashioned nonwoven sheet or web having suitable basis weight, caliper (thickness), absorbency and strength characteristics. Examples of suitable commercially available nonwoven substrates include those marketed under the tradename SONTARA® by DuPont and POLYWEB® by James River Corp.

As will be appreciated by one skilled in the art, the cleaning compositions of the present invention are ideally suited for use in liquid dish cleaning compositions. The method for using a liquid dish composition of the present invention comprises the steps of contacting soiled dishes with an effective amount, typically from about 0.5 ml. to about 20 ml. (per 25 dishes being treated) of the liquid dish cleaning composition of the present invention diluted in water.

EXAMPLES

Preparation of Inventive Alkoxylated Polyalkylenimines

Example 1

Incipient Ethoxylation

In a 2 l autoclave, 900 g of a 50% by weight aqueous solution of polyethylenimine 5000 (average molecular weight $M_W$ of 5000) were heated to 80° C. and purged three times with nitrogen up to a pressure of 5 bar. After the temperature had been increased to 90° C., 461 g of ethylene oxide were metered in up to 5 bar. The mixture was stirred at 90° C. under a constant pressure of 5 bar for a further 1 h. Volatile fractions were removed by stripping with nitrogen.

1345 g of a 68% by weight aqueous solution of polyethylenimine 5000 which contained 1 mol of ethylene oxide per mole of NH bond were obtained.

a) Ethoxylation and Propoxylation in Substance

In a 2 l autoclave, a mixture of 163 g of the aqueous solution obtained in the incipient ethoxylation and 13.9 g of a 40% by weight aqueous potassium hydroxide solution was heated to 70° C. After purging with nitrogen three times up to a pressure of 5 bar, the mixture was dewatered at 120° C. and a reduced pressure of 10 mbar for 4 h. Subsequently, 506 g of ethylene oxide were metered in at 120° C. up to a pressure of 8 bar. The mixture was stirred at 120° C. and 8 bar for 4 h. After decompression and purging with nitrogen, 519 g of propylene oxide were metered in at 120° C. up to a pressure of 8 bar. The mixture was stirred again at 120° C. and 8 bar for a further 4 h. Volatile fractions were removed by stripping with nitrogen.

1178 g of polyethylenimine 5000 which contained 10 mol of ethylene oxide and 7 mol of propylene oxide per mole of NH bond were obtained in the form of a light brown viscous liquid (amine titer: 0.9276 mmol/g; pH of a 1% by weight aqueous solution: 10.67).

b) Ethoxylation and Propoxylation in Xylene

In a 2 l autoclave, a mixture of 137 g of the aqueous solution obtained in the incipient ethoxylation, 11.8 g of a 40% by weight aqueous potassium hydroxide solution and 300 g of xylene was purged three times with nitrogen up to a pressure of 5 bar. At a jacket temperature of 175° C., the water present was separated out using a water separator supported by a gentle nitrogen stream within 4 h. Subsequently, 428 g of ethylene oxide were metered in at 120° C. up to a pressure of 3 bar. The mixture was stirred at 120° C. under a constant pressure of 3 bar for a further 2 h. 439 g of propylene oxide were then metered in at 120° C. up to a pressure of 3 bar. The mixture was stirred at 120° C. and 3 bar for a further 3 h. After the solvent had been removed under a reduced pressure of 10 mbar, the alkoxylation product was stripped with 4 bar of steam at 120° C. for 3 h.

956 g of polyethylenimine 5000 which contained 10 mol of ethylene oxide and 7 mol of propylene oxide per mole of NH bond were obtained in the form of a light brown viscous liquid (amine titer: 0.9672 mmol/g; pH of a 1% by weight aqueous solution: 10.69).

Example 2

In a 2 l autoclave, a mixture of 321 g of a 69.2% by weight aqueous solution of polyethylenimine 5000 (1 mol of ethylene oxide per mole of NH bond) which was obtained in incipient ethoxylation analogously to example 1 and 28 g of a 40% by weight aqueous potassium hydroxide solution was heated to 80° C. After it had been purged three times with nitrogen up to a pressure of 5 bar, the mixture was dewatered at 120° C. for 3 h and a vacuum of 10 mbar. Subsequently, 1020 g of ethylene oxide were metered at 120° C. up to a pressure of 8 bar. The mixture was then stirred at 120° C. and 8 bar for a further 4 h. Volatile fractions were removed by stripping with nitrogen.

1240 g of polyethylenimine 5000 which contained 9.9 mol of ethylene oxide per mole of NH bond were obtained in the form of a brown viscous solution (amine titer: 1.7763 mmol/g; pH of a 1% by weight aqueous solution: 11.3).

239 g of the ethoxylation product were then, after purging three times with nitrogen up to a pressure of 5 bar, reacted at 120° C. with approx. 87 g of propylene oxide (measurement precision+/−15 g) up to a pressure of 8 bar. The mixture was then stirred at 120° C. and 8 bar for 4 h. Volatile fractions were removed by stripping with nitrogen or a gentle vacuum of 500 mbar at 80° C.

340 g of polyethylenimine 5000 which contained 9.9 mol of ethylene oxide and 3.5 mol of propylene oxide per mole of NH bond were obtained in the form of a light brown viscous liquid (amine titer: 1.2199 mmol/g; pH of a 1% by weight aqueous solution: 11.05).

Example 3

Incipient Ethoxylation

In a 2 l autoclave, a mixture of 516 g of polyethylenimine 600 (average molecular weight $M_W$ of 600) and 10.3 g of water was flushed three times with nitrogen up to a pressure of 5 bar and heated to 90° C. 528 g of ethylene oxide were then metered in at 90° C. The mixture was stirred at 90° C. under a constant pressure of 5 bar for a further 1 h. Volatile fractions (especially water) were removed by stripping with nitrogen.

1040 g of polyethylenimine 600 which contained 1 mol of ethylene oxide per mole of NH bond were obtained in the form of a brown liquid.

Ethoxylation and Propoxylation in Substance

In a 2 l autoclave, a mixture of 86 g of the incipiently ethoxylated polyethylenimine 600 and 10.8 g of a 40% by weight aqueous potassium hydroxide solution was heated to 80° C. After it had been purged three times with nitrogen up to a pressure of 5 bar, the mixture was dewatered at 120° C. and a vacuum of 10 mbar for 2.5 h. After the vacuum had been removed with nitrogen, 384 g of ethylene oxide were metered in at 120° C. The mixture was stirred at 120° C. for a further 2 h. After decompression and purging with nitrogen, 393 g of propylene oxide were metered in at 120° C. The mixture was again stirred at 120° C. for a further 2 h. Volatile fractions were removed by stripping with nitrogen.

865 g of polyethylenimine 600 which contained 10 mol of ethylene oxide and 7 mol of propylene oxide per mole of NH bond were obtained in the form of a light brown viscous liquid (amine titer: 1.0137 mmol/g; pH of a 1% by weight aqueous solution: 11.15).

Example 4

7.3 g of dimethyl sulfate were added dropwise to 300 g of the alkoxylated polyethylenimine 5000 which has been obtained in example 1b) and stirred at 60° C. under nitrogen. In the course of this, the temperature rose to 70° C. After the mixture had been stirred at 70° C. for a further 3 hours, the mixture was cooled to room temperature.

307 g of polyethylenimine 5000, which contained 10 mol of ethylene oxide and 7 mol of propylene oxide per mole of NH bond and had a degree of quaternization of 22% were obtained in the form of a brown viscous liquid (amine titer: 0.7514 mmol/g).

Composition Formulations

Example 5

Granular Laundry Detergent

| | A wt % | B wt % | C wt % | D wt % | E wt % |
|---|---|---|---|---|---|
| $C_{11-12}$ Linear alkyl benzene sulphonate | 13-25 | 13-25 | 13-25 | 13-25 | 9-25 |
| $C_{12-18}$ Ethoxylate Sulfate | — | — | 0-3 | — | 0-1 |
| $C_{14-15}$ alkyl ethoxylate (EO = 7) | 0-3 | 0-3 | — | 0-5 | 0-3 |
| Dimethyl hydroxyethyl lauryl ammonium chloride | — | — | 0-2 | 0-2 | 0-2 |
| Sodium tripolyphosphate | 20-40 | — | 18-33 | 12-22 | 0-15 |
| zeolite | 0-10 | 20-40 | 0-3 | — | — |
| silicate builder | 0-10 | 0-10 | 0-10 | 0-10 | 0-10 |
| Carbonate | 0-30 | 0-30 | 0-30 | 5-25 | 0-20 |
| diethylene triamine penta acetate | 0-1 | 0-1 | 0-1 | 0-1 | 0-1 |
| polyacrylate | 0-3 | 0-3 | 0-3 | 0-3 | 0-3 |
| Carboxy Methyl Cellulose | 0.2-0.8 | 0.2-0.8 | 0.2-0.8 | 0.2-0.8 | 0.2-0.8 |
| Polymer[1] | 0.05-10 | 0.05-10 | 5.0 | 2.5 | 1.0 |
| Percarbonate | 0-10 | 0-10 | 0-10 | 0-10 | 0-10 |
| nonanoyloxybenzenesulfonate | — | — | 0-2 | 0-2 | 0-2 |
| tetraacetylethylenediamine | — | — | 0-0.6 | 0-0.6 | 0-0.6 |
| Zinc Phthalocyanine Tetrasulfonate | — | — | 0-0.005 | 0-0.005 | 0-0.005 |
| Brightener | 0.05-0.2 | 0.05-0.2 | 0.05-0.2 | 0.05-0.2 | 0.05-0.2 |
| $MgSO_4$ | — | — | 0-0.5 | 0-0.5 | 0-0.5 |
| ENZYMES | 0-0.5 | 0-0.5 | 0-0.5 | 0-0.5 | 0-0.5 |
| MINORS (perfume, dyes, suds stabilizers) | balance | balance | balance | balance | balance |

[1] A alkoxylated polyalkylenimine polymer or any mixture of polymers according to any of Examples 1, 2, 3 or 4.

Example 6

Liquid Laundry Detergent

| Ingredient | A wt % | B wt % | C wt % | D wt % | E wt % | F[5] wt % |
|---|---|---|---|---|---|---|
| sodium alkyl ether sulfate | 14.4% | 14.4% | | 9.2% | 5.4% | |
| linear alkylbenzene sulfonic acid | 4.4% | 4.4% | 12.2% | 5.7% | 1.3% | |
| alkyl ethoxylate | 2.2% | 2.2% | 8.8% | 8.1% | 3.4% | |
| amine oxide | 0.7% | 0.7% | 1.5% | | | |
| citric acid | 2.0% | 2.0% | 3.4% | 1.9% | 1.0% | 1.6% |
| fatty acid | 3.0% | 3.0% | 8.3% | | | 16.0% |
| protease | 1.0% | 1.0% | 0.7% | 1.0% | | 2.5% |
| amylase | 0.2% | 0.2% | 0.2% | | | 0.3% |
| lipase | | | | 0.2% | | |
| borax | 1.5% | 1.5% | 2.4% | 2.9% | | |
| calcium and sodium formate | 0.2% | 0.2% | | | | |
| formic acid | | | | | | 1.1% |
| Polymer[1] | 1.8% | 1.8% | 2.1% | | | 3.2% |
| sodium polyacrylate | | | | | 0.2% | |
| sodium polyacrylate copolymer | | | | 0.6% | | |
| DTPA[2] | 0.1% | 0.1% | | | | 0.9% |
| DTPMP[3] | | | 0.3% | | | |
| EDTA[4] | | | | | 0.1% | |
| fluorescent whitening agent | 0.15% | 0.15% | 0.2% | 0.12% | 0.12% | 0.2% |
| ethanol | 2.5% | 2.5% | 1.4% | 1.5% | | |
| propanediol | 6.6% | 6.6% | 4.9% | 4.0% | | 15.7% |
| sorbitol | | | | 4.0% | | |
| ethanolamine | 1.5% | 1.5% | 0.8% | 0.1% | | 11.0% |
| sodium hydroxide | 3.0% | 3.0% | 4.9% | 1.9% | 1.0% | |
| sodium cumene sulfonate | | | 2.0% | | | |
| silicone suds suppressor | | | 0.01% | | | |
| perfume | 0.3% | 0.3% | 0.7% | 0.3% | 0.4% | 0.6% |
| opacifier[5] | | | 0.30% | 0.20% | | 0.50% |
| water | balance | balance | balance | balance | balance | balance |
| | 100.0% | 100.0% | 100.0% | 100.0% | 100.0% | 100.0% |

[1] A alkoxylated polyalkylenimine polymer or any mixture of polymers according to any of Examples 1, 2, 3 or 4.
[2] diethylenetriaminepentaacetic acid, sodium salt
[3] diethylenetriaminepentakismethylenephosphonic acid, sodium salt
[4] ethylenediaminetetraacetic acid, sodium salt
[5] Acusol OP 301

Example 7

Liquid Dish Handwashing Detergents

| Composition | A | B |
|---|---|---|
| $C_{12-13}$ Natural AE0.6S | 29.0 | 29.0 |
| $C_{10-14}$ mid-branched Amine Oxide | — | 6.0 |
| $C_{12-14}$ Linear Amine Oxide | 6.0 | — |
| SAFOL ® 23 Amine Oxide | 1.0 | 1.0 |
| $C_{11}E_9$ Nonionic[2] | 2.0 | 2.0 |
| Ethanol | 4.5 | 4.5 |
| Polymer[1] | 5.0 | 2.0 |
| Sodium cumene sulfonate | 1.6 | 1.6 |
| Polypropylene glycol 2000 | 0.8 | 0.8 |
| NaCl | 0.8 | 0.8 |
| 1,3 BAC Diamine[3] | 0.5 | 0.5 |
| Suds boosting polymer[4] | 0.2 | 0.2 |
| Water | Balance | Balance |

[1] A alkoxylated polyalkylenimine polymer or any mixture of polymers according to any of Examples 1, 2, 3 or 4.
[2] Nonionic may be either $C_{11}$ Alkyl ethoxylated surfactant containing 9 ethoxy groups.
[3] 1,3, BAC is 1,3 bis(methylamine)-cyclohexane.
[4] (N,N-dimethylamino)ethyl methacrylate homopolymer

Example 8

Automatic Dishwasher Detergent

| | A | B | C | D | E |
|---|---|---|---|---|---|
| Polymer dispersant[2] | 0.5 | 5 | 6 | 5 | 5 |
| Carbonate | 35 | 40 | 40 | 35-40 | 35-40 |
| Sodium tripolyphosphate | 0 | 6 | 10 | 0-10 | 0-10 |
| Silicate solids | 6 | 6 | 6 | 6 | 6 |
| Bleach and bleach activators | 4 | 4 | 4 | 4 | 4 |
| Polymer[1] | 0.05-10 | 1 | 2.5 | 5 | 10 |
| Enzymes | 0.3-0.6 | 0.3-0.6 | 0.3-0.6 | 0.3-0.6 | 0.3-0.6 |
| Disodium citrate dihydrate | 0 | 0 | 0 | 2-20 | 0 |
| Nonionic surfactant[3] | 0 | 0 | 0 | 0 | 0.8-5 |
| Water, sulfate, perfume, dyes and other adjuncts | Balance to 100% | Balance to 100% | Balance to 100% | Balance to 100% | Balance to 100% |

[1] A alkoxylated polyalkylenimine polymer or any mixture of polymers according to any of Examples 1, 2, 3 or 4.
[2] Such as ACUSOL ® 445N available from Rohm & Haas or ALCOSPERSE ® from Alco.
[3] such as SLF-18 POLY TERGENT from the Olin Corporation.

Example 9

Use of Inventive Alkoxylated Polyalkylenimines in Laundering

To test their soil release performance, the alkoxylated polyalkylenimines were added to the wash liquor in three series of experiments together with the surfactants and builders specified in table 1, as model laundry detergents, or with a commercially available laundry detergent. The test cloths recited in table 2 were then washed under the washing conditions specified in tables 3a, 4a and 5a.

Soil release from the test cloths was determined by subjecting the test cloths to a reflectance measurement at 460 nm before and after the wash. Soil removal was computed from the reflectance values R before and after the wash and also the reflectance value of a white reference cotton fabric by the following formula, in %:

$$\text{Soil removal [\%]} = \frac{R(\text{after wash}) - R(\text{before wash})}{R(\text{white cotton}) - R(\text{before wash})} \times 100$$

All washes were carried out 2×. The soil removal values reported under the wash results in tables 3b, 4b and 5b correspond to the average of the measured values obtained under the same conditions. The values respectively obtained without added polymer are reported for comparison.

All amounts used are based on 100% active substance.

TABLE 1

Surfactants and builder

| | |
|---|---|
| Surfactant 1 | Lutensit ® A-LBN 50 (BASF; linear $C_{12}$-alkylbenzenesulfonate (Na salt)) |
| Surfactant 2 | Plurafac ® LF 401 (BASF; fatty alcohol alkoxylate) |
| Builder | sodium tripolyphosphate |

TABLE 2

Test cloths

| | |
|---|---|
| TG 1 | Triolein colored with Sudan Red: 0.2 g stain on 5 g white cotton fabric |
| TG 2 | Olive oil colored with Sudan Red; 0.2 g stain on 5 g white cotton fabric |
| TG 3 | WFK 10D (sebum/pigment soil cloth from WFK*) |
| TG 4 | EMPA 118 (sebum/pigment soil cloth from EMPA**) |
| TG 5 | Scientific Services*** Sebum |
| TG 6 | WFK 10PF (vegetable fat/pigment soil cloth from WFK) |
| TG 7 | CFT-CS10 (colored butter on cotton fabric from CFT****) |
| TG 8 | CFT-CS 62 (colored pork fat on cotton fabric from CFT) |

*Research Institute for Cleaning Technology, Krefeld
**Swiss Materials Testing and Research Institute, St. Gallen, CH
***Scientific Services S/D, Inc., Sparrow Bush, NY, USA
****Center for Test Materials BV, Vlaardingen, NL

TABLE 3a

Wash conditions

| | |
|---|---|
| Instrument | Launder-O-Meter (from Atlas, Chicago, USA) |
| Wash temperature | 25° C. |
| Polymer dosage | 30 mg/l |
| Laundry detergent | Model laundry detergent from surfactant 1/builder |
| Surfactant dosage | 300 mg/l |
| Builder dosage | 200 mg/l |
| Water hardness | 2.5 mmol/l Ca:Mg 3:1 |
| Liquor ratio | 12.5:1 |
| Wash time | 30 min |
| Test cloths | TG 1 and TG 2 |
| | The test cloths were each washed separately with a further 5 g of white cotton fabric per pot. |

TABLE 3b

Wash results

| | Soil removal [%] | |
|---|---|---|
| Polymer | TG 1 | TG 2 |
| from Example 3 | 42.6 | 38.4 |
| no addition | 38.5 | 32.4 |

TABLE 4a

Wash conditions

| | |
|---|---|
| Instrument | Launder-O-Meter (from Atlas, Chicago, USA) |
| Wash temperature | 25° C. |
| Polymer dosage | 25 mg/l |
| Laundry detergent | Model laundry detergent from surfactant 1/surfactant 2 |
| Surfactant 1 dosage | 150 mg/l |
| Surfactant 2 dosage | 50 mg/l |
| Water hardness | 1.0 mmol/l Ca:Mg 3:1 |
| Liquor ratio | 12.5:1 |
| Wash time | 30 min |
| Test cloths | TG 3, TG 4, TG 6, TG 7 and TG 8 |
| | The soil cloths were each trimmed to 4 × 4 cm and stitched onto white cotton. In each case, 2 cotton fabrics with stitched-on TG 3, TG 4 and TG 6 cloth and also 2 cotton fabrics with stitched-on TG 7 and TG 8 cloth were washed together. A further 5 g of white cotton fabric were included in each wash. |

TABLE 4b

Wash results

| | Soil removal [%] | | | | |
|---|---|---|---|---|---|
| Polymer | TG 3 | TG 4 | TG 6 | TG 7 | TG 8 |
| from Example 3 | 29.7 | 8.2 | 48.1 | 6.6 | 3.9 |
| no addition | 29.4 | 6.8 | 47.4 | 5.9 | 2.5 |

TABLE 5a

Wash conditions

| | |
|---|---|
| Instrument | Launder-O-Meter (from Atlas, Chicago, USA) |
| Wash temperature | 25° C. |
| Polymer dosage | (1) 20 mg/l; (2) 40 mg/l |
| Laundry detergent | Tide liquid (Procter & Gamble) |
| Laundry detergent dosage | 1 g/l |
| Water hardness | 1.0 mmol/l Ca:Mg 3:1 |
| Liquor ratio | 12.5:1 |
| Wash time | 30 min |
| Test cloths | TG 3, TG 4, TG 5 and TG 6 |
| | The soil cloths were each trimmed to 4 × 4 cm and stitched onto white cotton. In each case 2 cotton fabrics with stitched-on soil cloth were washed together. A further 5 g of white cotton fabric were included in each wash. |

TABLE 5b

| | Wash results | | | |
|---|---|---|---|---|
| | Soil removal [%] | | | |
| Polymer | TG 3 | TG 4 | TG 5 | TG 6 |
| from Example 3 (20 mg/l) | 39.6 | 7.6 | 31.4 | 50.0 |
| from Example 3 (40 mg/l) | 40.2 | 8.2 | 32.1 | 50.6 |
| no addition | 37.2 | 5.4 | 28.5 | 44.4 |

The results of the wash tests show that adding the inventive alkoxylated polyalkylenimines leads to a distinct improvement in soil release with regard to fatty and oily stains from cotton fabric.

Unless otherwise noted, all component or composition levels are in reference to the active level of that component or composition, and are exclusive of impurities, for example, residual solvents or by-products, which may be present in commercially available sources.

All percentages and ratios are calculated by weight unless otherwise indicated. All percentages and ratios are calculated based on the total composition unless otherwise indicated.

It should be understood that every maximum numerical limitation given throughout this specification includes every lower numerical limitation, as if such lower numerical limitations were expressly written herein. Every minimum numerical limitation given throughout this specification will include every higher numerical limitation, as if such higher numerical limitations were expressly written herein. Every numerical range given throughout this specification will include every narrower numerical range that falls within such broader numerical range, as if such narrower numerical ranges were all expressly written herein.

All documents cited in the Detailed Description of the Invention are, are, in relevant part, incorporated herein by reference; the citation of any document is not to be construed as an admission that it is prior art with respect to the present invention.

While particular embodiments of the present invention have been illustrated and described, it would be obvious to those skilled in the art that various other changes and modifications can be made without departing from the spirit and scope of the invention. It is therefore intended to cover in the appended claims all such changes and modifications that are within the scope of this invention.

What is claimed is:

1. A laundry detergent or cleaning composition which comprises an amphiphilic water-soluble alkoxylated polyalkylenimine of the general formula I

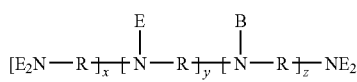

in which the variables are each defined as follows:
R are identical or different, linear or branched $C_2$-$C_6$-alkylene radicals;
B is a branch;
E is a block alkylenoxy unit of the formula

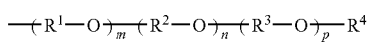

$R^1$ is 1,2-propylene, 1,2-butylene and/or 1,2-isobutylene;
$R^2$ is ethylene;
$R^3$ is 1,2-propylene;
$R^4$ are identical or different radicals selected from either hydrogen or a $C_1$-$C_4$-alkyl;
wherein the block alkylenoxy unit, E, comprises an inner polyethylene oxide block and an outer polypropylene oxide block;
x, y, z are each from 2 to 150, where the sum of x+y+z means a number of alkylenimine units which corresponds to an average molecular weight $M_W$ of the polyalkylenimine before the alkoxylation of from 300 to 10,000;
m is a rational number from 0 to 2;
n is a rational number from 6 to 18;
p is a rational number from 3 to 12; where $0.8 \leq n/p \leq 1.0(x+y+z)^{1/2}$;
or quaternization products thereof.

2. A laundry detergent or cleaning composition according to claim 1 wherein the laundry detergent or cleaning composition is selected from the group consisting of liquid laundry detergent compositions, solid laundry detergent compositions, hard surface cleaning compositions, liquid hand dishwashing compositions, solid automatic dishwashing compositions, liquid automatice dishwashing, and tab/unit dose form automatic dishwashing compositions.

3. A laundry detergent or cleaning composition according to claim 1 wherein the detergent or composition comprise from 0.05 to 10% by weight of the detergent or composition, of the amphiphilic water-soluble alkoxylated polyalkylenimine.

4. A laundry detergent or cleaning composition according to claim 1 wherein the detergent or composition further comprises a surfactant system.

5. A laundry detergent or cleaning composition according to claim 4 wherein the surfactant system comprises $C_{10}$-$C_{15}$ alkyl benzene sulfonates.

6. A laundry detergent or cleaning composition according to claim 4 wherein the surfactant system comprises $C_8$-$C_{18}$ linear alkyl sulfonate surfactant.

7. A laundry detergent or cleaning composition according to claim 5 wherein the surfactant system further comprises one or more co-surfactant selected from the groups consisting of nonionic surfactants, cationic surfactants, anionic surfactants and mixtures thereof.

8. A laundry detergent or cleaning composition according to claim 1 wherein the detergent or composition further comprises cleaning adjunct additives.

9. An cleaning implement comprising a nonwoven substrate and the laundry detergent or cleaning composition according to claim 1.

10. The use of an amphiphilic water-soluble alkoxylated polyalkylenimine of the general formula I

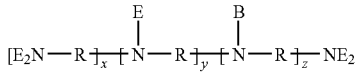

in which the variables are each defined as follows:
R are identical or different, linear or branched $C_2$-$C_6$-alkylene radicals;
B is a branch;
E is a block alkylenoxy unit of the formula

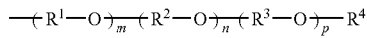

$R^1$ is 1,2-propylene, 1,2-butylene and/or 1,2-isobutylene;

$R^2$ is ethylene;
$R^3$ is 1,2-propylene;
$R^4$ are identical or different radicals selected from either hydrogen or a $C_1$-$C_4$-alkyl;
wherein the block alkylenoxy unit, E, comprises an inner polyethylene oxide block and an outer polypropylene oxide block;
x, y, z are each from 2 to 150, where the sum of x+y+z means a number of alkylenimine units which corresponds to an average molecular weight $M_W$ of the polyalkylenimine before the alkoxylation of from 300 to 10,000;
m is a rational number from 0 to 2;
n is a rational number from 6 to 18;
p is a rational number from 3 to 12; where $0.8 \leq n/p \leq 1.0(x+y+z)^{1/2}$;
or quaternization products thereof,
as a soil release-promoting additive to laundry detergents and cleaning compositions comprising the step of adding the amphiphilic water-soluble alkoxylated polyalkylenimine to the laundry detergents or cleaning compositions.

11. A laundry detergent or cleaning composition according to claim 6 wherein the surfactant system further comprises one or more co-surfactant selected from the groups consisting of nonionic surfactants, cationic surfactants, anionic surfactants and mixtures thereof.

* * * * *